(12) United States Patent
Balasubramanian (10) Patent No.: US 12,314,947 B2
(45) Date of Patent: *May 27, 2025

(54) SYSTEMS AND METHODS FOR RECONCILING ELECTRONIC TRANSACTIONS FACILITATED BY A COMMERCE PLATFORM

(71) Applicant: Stripe, Inc., South San Francisco, CA (US)

(72) Inventor: Girish Balasubramanian, Fremont, CA (US)

(73) Assignee: Stripe, Inc., South San Francisco, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 18/110,833

(22) Filed: Feb. 16, 2023

(65) Prior Publication Data

US 2023/0196359 A1 Jun. 22, 2023

Related U.S. Application Data

(63) Continuation of application No. 16/677,364, filed on Nov. 7, 2019, now Pat. No. 11,587,082.

(51) Int. Cl.
*G06Q 20/00* (2012.01)
*G06Q 20/02* (2012.01)
(Continued)

(52) U.S. Cl.
CPC ........... *G06Q 20/401* (2013.01); *G06Q 20/02* (2013.01); *G06Q 20/10* (2013.01); *G06Q 20/12* (2013.01);
(Continued)

(58) Field of Classification Search
CPC .................................................... G06Q 20/401
See application file for complete search history.

(56) References Cited

U.S. PATENT DOCUMENTS

| 9,195,984 B1 * | 11/2015 | Spector ............... G06Q 20/367 |
| 2002/0087467 A1 * | 7/2002 | Mascavage, III ...... G06Q 20/02 |
| | | 705/39 |

(Continued)

OTHER PUBLICATIONS

Pay-Cloak: A Biometric Back Cover for Smartphone (Year: 2017).*
(Continued)

*Primary Examiner* — Bruce I Ebersman
(74) *Attorney, Agent, or Firm* — BAKERHOSTETLER (57) ABSTRACT

A method and apparatus for reconciling electronic transactions facilitated by a commerce platform are described. The method may include receiving, the commerce platform, requests from a merchant system to authorize a plurality of financial transactions. The method may also include transmitting an authorization to the merchant system authorizing the merchant system to perform the financial transaction. The authorization may include a unique transaction identification (ID) corresponding to the request. The method may also include receiving from the merchant system, for each transaction ID, an order number associated with the transaction ID. The method may also include generating a settlement file comprising the transaction IDs. Each transaction ID may be arranged in an order in the settlement file according to its associated order number. The method may also include transmitting the settlement file to the merchant device.

11 Claims, 6 Drawing Sheets

(51) Int. Cl.
*G06Q 20/10* (2012.01)
*G06Q 20/12* (2012.01)
*G06Q 20/20* (2012.01)
*G06Q 20/32* (2012.01)
*G06Q 20/38* (2012.01)
*G06Q 20/40* (2012.01)
*G06Q 30/06* (2023.01)

(52) U.S. Cl.
CPC ......... *G06Q 20/20* (2013.01); *G06Q 20/3224* (2013.01); *G06Q 20/382* (2013.01); *G06Q 30/06* (2013.01)

(56) References Cited

U.S. PATENT DOCUMENTS

| | | | | |
|---|---|---|---|---|
| 2003/0126075 | A1* | 7/2003 | Mascavage, III | G06Q 20/10 705/42 |
| 2006/0059073 | A1* | 3/2006 | Walzak | G06Q 40/03 705/38 |
| 2008/0120129 | A1* | 5/2008 | Seubert | G06Q 40/125 705/305 |
| 2008/0272188 | A1* | 11/2008 | Keithley | G06Q 30/06 235/379 |
| 2012/0290379 | A1* | 11/2012 | Hoke | G06Q 30/02 705/14.25 |
| 2012/0290382 | A1* | 11/2012 | Martin | G06Q 30/06 705/14.34 |
| 2012/0290400 | A1* | 11/2012 | Hoke | G06Q 30/04 705/14.66 |
| 2013/0275296 | A1* | 10/2013 | Tietzen | G06Q 30/06 705/39 |
| 2014/0025578 | A1* | 1/2014 | Evans | G06Q 20/40 705/44 |
| 2015/0154579 | A1* | 6/2015 | Teicher | G06Q 20/322 705/21 |
| 2015/0317668 | A1* | 11/2015 | Tietzen | G06Q 30/0239 705/14.55 |
| 2017/0232300 | A1* | 8/2017 | Tran | G06F 1/163 434/247 |
| 2018/0078843 | A1* | 3/2018 | Tran | G09B 19/0038 |
| 2018/0117446 | A1* | 5/2018 | Tran | G06F 1/163 |
| 2018/0264347 | A1* | 9/2018 | Tran | G06V 40/28 |
| 2018/0285840 | A1* | 10/2018 | Hasan | G06Q 50/01 |
| 2019/0130462 | A1* | 5/2019 | Tietzen | G06Q 30/0226 |
| 2019/0318402 | A1* | 10/2019 | Schulz | G06Q 30/0619 |
| 2019/0361917 | A1* | 11/2019 | Tran | H04W 12/108 |
| 2020/0151804 | A1* | 5/2020 | Butters | G06Q 30/0633 |
| 2020/0410559 | A1* | 12/2020 | Qaudeer | H04M 15/50 |

OTHER PUBLICATIONS

Instant payment versus smartphone payment: The big fight?, (Year: 2017).*
Notice of Allowance dated Oct. 26, 2022 for U.S. Appl. No. 16/677,364, 16 pages.
Non-final Office Action mailed Sep. 21, 2021 in U.S. Appl. No. 16/677,364, filed Nov. 7, 2019 (U.S. Pat. No. 11,587,082 issued Feb. 21, 2023).
Final Office Action mailed Feb. 4, 2022 in application No. U.S. Appl. No. 16/677,364, filed Nov. 7, 2019 (U.S. Pat. No. 11,587,082 issued Feb. 21, 2023).
Inter-Bank Payment System on Enterprise Blockchain Platform (Year: 2018).
Implementation of Blockchain in Financial Sector to Improve Scalability (Year: 2019).

* cited by examiner

FIG. 1

| SETTLEMENT FILE 210 | | | |
|---|---|---|---|
| ORDER NUMBER | TRANSACTION ID | AMOUNT | PAYOUT DATE |
| 1052 | VIFWP4 | $15.99 | 2019-10-8 |
| 1053 | M1V0M2 | $25.63 | 2019-10-8 |
| 1054 | 6HTTG0 | $10.00 | 2019-10-8 |
| 1055 | GLPRLP | $65.50 | 2019-10-8 |
| 1056 | SVLWAD | $22.35 | 2019-10-8 |
| 1057 | BT2VUL | $153.68 | 2019-10-10 |
| 1059 | 9WKXN9 | $3.21 | 2019-10-8 |
| 1060 | 10ZMQI | -$89.99 | 2019-10-8 |
| 1061 | J8JRZ4 | $25.00 | 2019-10-10 |
| 1062 | X8VS4X | $14.58 | 2019-10-8 |
| 1063 | GJ9WJ1 | $39.81 | 2019-10-9 |
| 1064 | 3LAYNL | $211.66 | 2019-10-9 |
| 1065 | 7CGCC3 | $59.11 | 2019-10-9 |
| 1066 | YZJDW8 | $60.54 | 2019-10-9 |
| 1067 | A51KBQ | $41.23 | 2019-10-9 |

SYSTEMS AND METHODS FOR RECONCILING ELECTRONIC TRANSACTIONS FACILITATED BY A COMMERCE PLATFORM

PRIORITY

The present application claims the benefit of, and is a continuation of U.S. patent application Ser. No. 16/677,364, filed Nov. 7, 2019, now U.S. Pat. No. 11,587,082, which is incorporated by reference in its entirety.

BACKGROUND

Merchants, such as grocers, car services, dry cleaning services, etc., provide their products and services to consumers. Such merchants often employ agents to deliver their products and/or provide the actual services. For example, a person acting on the merchant's behalf will drive a consumer in their own car, deliver food ordered through a merchant website, pick up and/or drop off clothes dry cleaned by the merchant, etc.

These merchants, although providing a system for supplying products and/or services to consumers through their agents, often do not perform the financial processing associated with the merchant transactions. Instead, merchants utilize commerce platforms to process financial transactions for the products and/or services provided to consumers through their agents. This may include the agent establishing an account with the merchant and then establishing an account with the commerce platform. Once the accounts are established, the agent can accept payments from customers of the merchant for provided products and/or services, and the commerce platform processes the accepted payments. This processing may include running credit cards, crediting a merchant account for the transaction, crediting the agent responsible for the transaction, debiting a commerce platform fee for processing the transaction on behalf of the merchant, as well as performing other commerce related transactions for the merchant and/or agent such as providing payouts for products/services rendered on behalf of a merchant.

A given merchant may perform hundreds or even thousands of financial transactions in a day. The commerce platform and the merchant may both have an interest in tracking these financial transactions so that pay outs occur regularly and fairly. However, current reconciliation systems are slow and cumbersome, and may not provide a merchant with sufficient information to accurately account for transactions.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "transmitting," "initiating", "receiving", "generating," "authenticating", "aggregating", "directing", "redirecting", "associating", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

The present disclosure describes methods and systems for reconciling electronic transactions that are facilitated by a commerce platform by generating an ordered settlement file, such as an ordered set of transaction records. During a given period of time (e.g., a day, week, a custom range of time, etc.), a merchant may make any number of sales. For example, an online clothing retailer may sell one hundred t-shirts on a Saturday. The sales may be facilitated by a commerce platform that handles the processing of payments, as discussed herein. The commerce platform may also collect money from the customers' bank accounts. In embodiments, the commerce platform may then pay the merchant a sum of money periodically that corresponds to the revenue the merchant made through the sales that occurred during the period of time. For example, the commerce platform may collect $2500 from 100 customers who each bought a $25 t-shirt from the online clothing retailer/merchant on a Saturday. After the commerce platform subtracts its own fees from the total revenue, for example, it may owe the merchant $2425 for Saturday's clothing sales. In other embodiments, payouts may occur at other increments, such as per transaction, day, week, or a time period specified by a merchant (e.g., corresponding to the merchant's accounting cycle).

However, for a multitude of reasons, the number of payouts, the payouts themselves, and/or payout total processed by the commerce platform may differ from the number calculated by the merchant. Each party (e.g., the commerce platform and the merchant) may believe that different amounts are to be paid by the commerce platform to the merchant. Furthermore, when there is a mismatch between the commerce platform's payouts and the merchants expected payouts, the ability for a merchant and/or the commerce platform to locate the source of that mismatch is slow and cumbersome. For this reason, in embodiments, the commerce platform generates an improved settlement file that includes an ordered list of the transactions made during the given time period (e.g., day, week, custom range, etc.), which improves the speed and accuracy of reconciliations performed using the settlement file. That is, the settlement file generated and used according to the technique discussed herein may help both the merchant and the commerce platform reconcile their financial statements at the end of each time period. In addition, the ordered and organized form of the settlement file may improve the accuracy of the calculated payout, streamline calculations performed by merchant system(s) and/or commerce platform system(s), and reduce the latency of the reconciliation process between the merchant and the commerce platform.

In particular embodiments, the settlement file may be generated automatically as follows. The commerce platform may receive several requests from a merchant system to authorize several financial transactions. The commerce platform may approve these requests after authenticating the users and determining that the requests are not fraudulent. The commerce platform may send to the merchant an authorization for each request that is approved. The authorization may include a transaction identification (ID) that corresponds to the authorization request and that uniquely identifies the transaction. This transaction ID may be generated by the merchant or the commerce platform. The commerce platform may then receive from the merchant system, for each transaction ID, an order number associated with the transaction ID. However, in some embodiments, the commerce platform may alternatively generate an order number associated with each transaction ID. In embodiments, the order number is a sequential identifier (e.g., a number or other data that defines an ordering) that orders authorized transactions. The commerce platform may receive and/or generate multiple order numbers and associated transaction IDs from the merchant system that each correspond to a transaction completed between the merchant and a consumer. Periodically (e.g., at the end of the given time period, in response to merchant request, etc.), the commerce platform may generate a settlement file that includes the transaction IDs that were generated and sent during the time period along with their associated order numbers. Additional information, such as settlement/payout date for a given transaction, a running total for a given period of time associated with the settlement file, security measures (e.g., a signature attached to the settlement file or individual transactions), etc. may also be included in the settlement file.

Furthermore, the transaction IDs may be arranged in the settlement file according to the order numbers, such that the order numbers appear in sequential order (e.g., ascending order, descending order). In embodiments, the transaction IDs may not be sequential. For example, a merchant may initiate transaction_M followed by transaction_N, but transaction_N is authorized prior to transaction_M. In this example, the order number of transaction_N (e.g., the later initiated transaction) would be before the order number of transaction_M in the sequential listing of transactions in the embodiments of the settlement file discussed herein. In embodiments, the order numbers may provide an order to the transaction IDs such that the merchant may dictate the order of the transaction IDs, rather than the commerce platform determining the order. However, in embodiments, the commerce platform may define order numbers of transaction, for example based on order in which the commerce platform performs transaction authorizations, and returns the order number with an authorization to the merchant. In either embodiment, the setting of the order within a settlement file based on order number can improve accuracy and efficiency of the reconciliation process, which improves the overall transaction interaction between the merchant and the commerce platform. That is, for example, the ordering enables merchant and commerce platform systems to agree on an ordered set of transaction data when comparing settlement records. Furthermore, it can simplify and improve the processing time as well as reduces latency of the reconciliation process between the merchant and the commerce platform by reducing the data set to those relevant and ordered transactions from the set time period, and providing for more easily locating missing records, mismatched record counts, etc. using a shared index of transaction records (i.e., indexed by the order number). To facilitate the merchant system in sending/receiving the order numbers for specified transactions, the commerce platform distributes an application program interface (API) that implements a protocol for the generation and exchange of order numbers for transaction IDs. For example, the API may execute any suitable function, for example, setPaymentOrder (transaction ID, order number), where "transaction ID," and "order" are inputs to the API.

Figure 1:
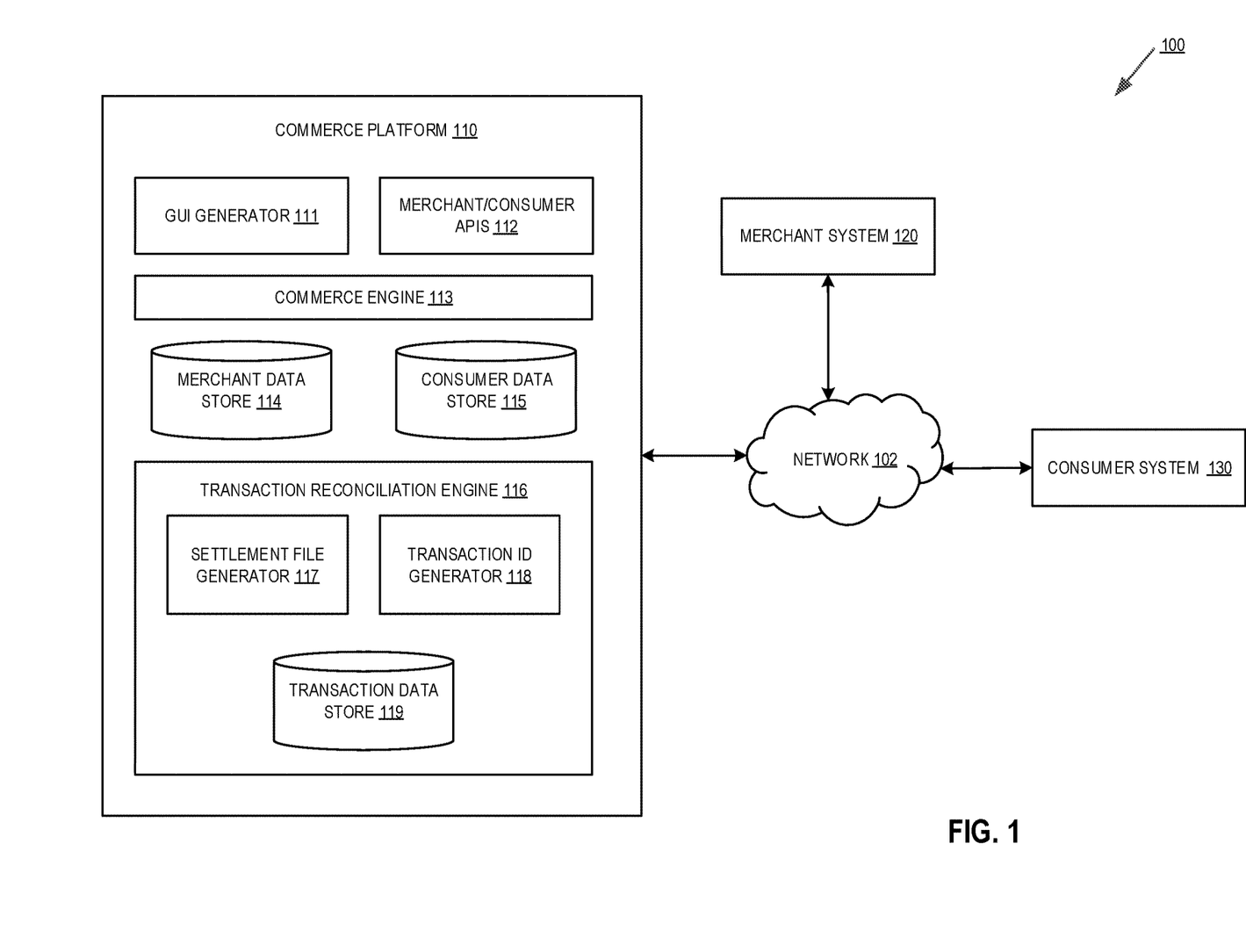
FIG. 1 is a block diagram of an exemplary system architecture for reconciling financial transactions between a merchant and one or more consumers and facilitated by a commerce platform.

FIG. 1 is a block diagram of an exemplary system architecture for reconciling financial transactions facilitated by a commerce platform 110. In one embodiment, the system 100 includes one or more computer systems, such as consumer system 130, a merchant system 120, and a commerce platform 110. In one embodiment, consumer system 130 is a mobile computing device, such as a smartphone, tablet computer, smartwatch, desktop computer system, laptop computer system, etc. The merchant system 120 and commerce platform 110 may also be computing devices, such as one or more server computer systems, desktop computer systems, etc.

The consumer system 130, merchant system 120, and commerce platform 110 may be coupled to a network 102 and communicate with one another using any of the standard protocols for the exchange of information. In embodiments, the protocol may include secure protocols that encrypt or otherwise protect the information communicated over network 102. In one embodiment, one or more of the consumer system 130, merchant system 120, and commerce platform 110 may run on one Local Area Network (LAN) and may be incorporated into the same physical or logical system, or different physical or logical systems. Alternatively, the consumer system 130, merchant system 120, and commerce platform 110 may reside on different LANs, wide area networks, cellular telephone networks, etc. that may be coupled together via the Internet but separated by firewalls, routers, and/or other network devices. In one embodiment, commerce platform 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, merchant system 120 is responsible for providing a system through which services and/or products are provided to users of consumer systems (e.g., the customers of the merchant using consumer system 130 to access the products and/or services offered for sale by merchant system 120). The merchant system 120 may, for example, provide a system through which laundry service, food delivery, transportation, personal service, etc. may be supplied to a consumer. Such services and/or products can be provided to the consumer via a merchant website provided through merchant system 120, a mobile application developed or distributed by the merchant system 120 that enables a consumer to order merchant products and/or services, as well as other forms of providing products and services of the merchant system 120. Furthermore, as discussed herein, the commerce platform 110 may support any number of merchant systems and any number of users associated with one or more of the supported merchant systems.

In embodiments, the user of consumer system 130 communicates with merchant system 120 through a merchant mobile application executing on consumer system 130 and/or a merchant web page/application executing on the consumer system 130. The merchant applications, in embodiments discussed herein, provide an interface for establishing communication between the corresponding consumer system 130 and the merchant system 120 to enable the merchant to provide a good for the client or a service on behalf of the merchant, deliver a product to a customer of the merchant, etc. For example, the merchant applications (e.g., a mobile or web application) receive updates from the merchant system 120, such as available jobs, establish preference setting for upcoming jobs, establish an account with the merchant system 120 that associates a user of the consumer system 130 with the merchant system 120, as well as other functions. Furthermore, the merchant mobile application or merchant web page/application provide the user interface through which the user of consumer system 130 can interact with the merchant system 120.

In one embodiment, merchant system 120 does not handle financial transactions for the product and/or services which are provided by the agents of merchant. That is, when a product or service of the merchant system 120 is provided to a consumer, the merchant system 120 does not receive consumer payment information (e.g., credit card information, digital asset information, etc.), process payments from accounts associated with the payment information, credit the merchant upon successful payment collection, credit the agent/user upon successful payment collection, etc. Instead, merchant system 120 utilizes the services of commerce platform 110 to perform the financial transactions and/or processing when a merchant system 120 service and/or product is provided to a consumer by a merchant's agent.

Thus, when a consumer pays for a good or service, the money paid by a financial institution on behalf of the customer may not go directly to the merchant. The money may first go to the commerce platform 110. Commerce platform 110 may then have an obligation to pay the merchant one or more payment amounts according to how many financial transactions occurred on behalf of the merchant system 120 and the cost of each of those financial transactions. For example, a merchant may be an online clothing retailer. On a given day, the online clothing retailer may sell 100 t-shirts for $25 each to 85 unique customers. The commerce platform 110 may process all of the financial transactions. The money for these financial transactions may initially go to the commerce platform 110, which may then pay the merchant at the end of a specified period of time (e.g., at the end of the day). Continuing with the example above, after accounting for fees and other costs, the commerce platform 110 may need to pay the merchant $2,399.50 for the day's sales (i.e., the 100 t-shirts sold for $25 each). The commerce platform 110 may need to keep track of these transactions and may need to provide an accounting of the transactions and the amount for each transaction. As discussed herein, the commerce platform 110 may generate a settlement file with transactions ordered based on sequential order IDs that may aid the commerce platform 110 and the merchant system 120 in reconciling the total payment obligations and expectations for the given time period (e.g., total transaction amount, transaction total, transactions within a set, etc.). Additional information, such as running payout total for a settlement period, dates of payouts for transactions within a settlement file, as well as other information relevant to the reconciliation of transactions may also be included in the settlement file.

In one embodiment, commerce platform 110 is a distributed commerce platform 110 that is responsible for maintaining one or more accounts for merchant system 120, such as accounts that associate merchant system 120s with banking systems (not shown), identify service terms between the merchant system 120 and the commerce platform 110, identify how to credit agents of a merchant, identify a fee associated with each transaction processed by commerce platform 110, etc. Commerce platform 110, in embodiments, further maintains financial accounts for the agents/users of merchant system 120, which are accounts that associate specific mobile devices (e.g., consumer system 130, user login credentials, user security keys, etc.), with the agents/users of merchant system 120. Once the merchant accounts and user accounts are established on commerce platform 110, a user of consumer system 130 may provide products and/or services on behalf of merchant system 120, including receiving payments from consumers, providing payment information to commerce platform 110, providing payments to merchant system 120 and/or a user account associated with a user of consumer system 130, as well as receiving payouts for services rendered, goods delivered, or performance of other functions on behalf of the merchant system 120.

Commerce platform 110 may include various components that enables it to successfully interface with network 102, merchant system 120, and consumer system 130, as well as successfully process payments from consumers and successfully pay out an appropriate amount of money to merchants. Such components may include a GUI generator 111, merchant/consumer APIs 112, a commerce engine 113, a merchant data store 114, a consumer data store 115, and a transaction reconciliation engine 116, which may be executed by the commerce platform 110 as software, hardware, firmware, or a combination. The transaction reconciliation engine 116 may include a settlement file generator 117, a transaction ID generator 118, and a transaction data store 119. The transaction reconciliation engine 116 may access or interface with the other components of the commerce platform 110 as needed using any suitable method. The settlement file generator 117 may generate a settlement file that is sent to the merchant system 120 at the end of a given period of time, in response to merchant request, or at other intervals. To generate the settlement file, the settlement file generator 117 may access information in the transaction data store 119, which may include transaction IDs as generated by transaction ID generator 118, as well as order numbers, that may be received via an API from the merchant system 120.

In embodiments, the GUI generator 111 may supply a user interface to consumer system 130 and merchant system 120. In one embodiment, the user interface generated by GUI generator 111 may be a web based user interface that redirects consumer system 130 from the merchant user interface to the commerce platform 110's 110 user interface. That is, the supplied user interface of commerce platform 110 controls and alters the display of the consumer system 130 while performing, account authentication and payment processing.

In particular embodiments, merchant/consumer APIs 112 may include any suitable API to allow the creation of applications that enable the functionality of merchant system 120 and consumer systems (e.g., consumer system 103) to exchange goods and services for money via the commerce platform 110. An API that may be included in merchant/consumer APIs 112 may utilize any suitable function, and may be called, for example, setPaymentOrder (transaction ID, order number), where "transaction ID," and "order" are inputs to the API. In particular embodiments, the merchant system 120 may input the transaction order and an order number for each transaction that occurs during a given time period. This information may be sent to the commerce platform 110 for use in generating the settlement file. In another embodiment, the transaction ID generator 118 may alternatively generate order numbers for transactions based on an order in which the transactions are authorized, and return the order number with transaction authorizations to merchant system 120. Commerce engine 113 may verify the identity of the merchant and consumer and authenticate the merchant system 120 and consumer system 130. The commerce engine 113 may also process any received payment information, including paying out a merchant based on their account information stored in merchant data store 114, and receiving payment from a consumer based on their account information stored in consumer data store 115. In embodiments, the capture of payout information by commerce platform may also be associated with transaction ID order number pairs, so that an indication may be provided in a settlement file of when an actual payout, charge back, refund, etc. occurred with respect to ordered transactions occurring in a settlement file.

As an example of how the above components may function together to facilitate reconciliation of electronic financial transactions between a merchant and one or more consumers, a merchant system 120 may be an online shoe retailer. The shoe retailer may sell 100 pairs of shoes during a particular period of time (e.g., one day, 12:00 am to 11:59 PM on Saturday). The GUI generator 111 may provide the appropriate graphical user interfaces for both the consumer systems 130 and the merchant system 120 to authenticate customers and process the payments. Using the merchant/consumer APIs 112, the commerce platform 110 may interface with the consumers' consumer systems 130 and the merchant's merchant system 120 to enable payment processing. The commerce engine 113 may authenticate the users and process the payment. Before payment is processed, the merchant system 120 may need to first send an authorization request to the commerce platform 110. Then upon receiving an authorization result, commerce platform 110 can complete a transaction with the consumer system 130. Furthermore, during the exchange of communications between the systems, commerce platform 110 collects information for generation of the settlement file improving the reconciliation process between the commerce platform 110 and the merchant system 120, such as transaction IDs generated by merchant system 120, order numbers generated and associated with transaction IDs as generated by the merchant system 120 or commerce platform 110, payout date information also associated with transaction/order number pairs, etc. Then, commerce platform 110 may generate and transmit a settlement file for a given period of time, merchant specified date range, etc. to the merchant system 120 for performing reconciliation of transactions.

In embodiments, the ordered nature of the settlement file generated by the commerce platform 110, and the information contained therein (e.g., transactions associated with an ordered listing based on authorization order, payout date, security features including commerce platform signatures, etc.), enables merchant system 120 and commerce platform 110 to perform a more efficient and more reliable reconciliation process. That is, the inclusion of an ordered series of transactions for which payout/settlement has occurred, the date associated with the payout/settlement, and security features, ensures that merchant system 120 has sufficient information to rapidly and reliably perform reconciliation for transactions (e.g., identified by transaction IDs) that occur within a period of time, and for which commerce platform has performed payment processing.

Figure 2:
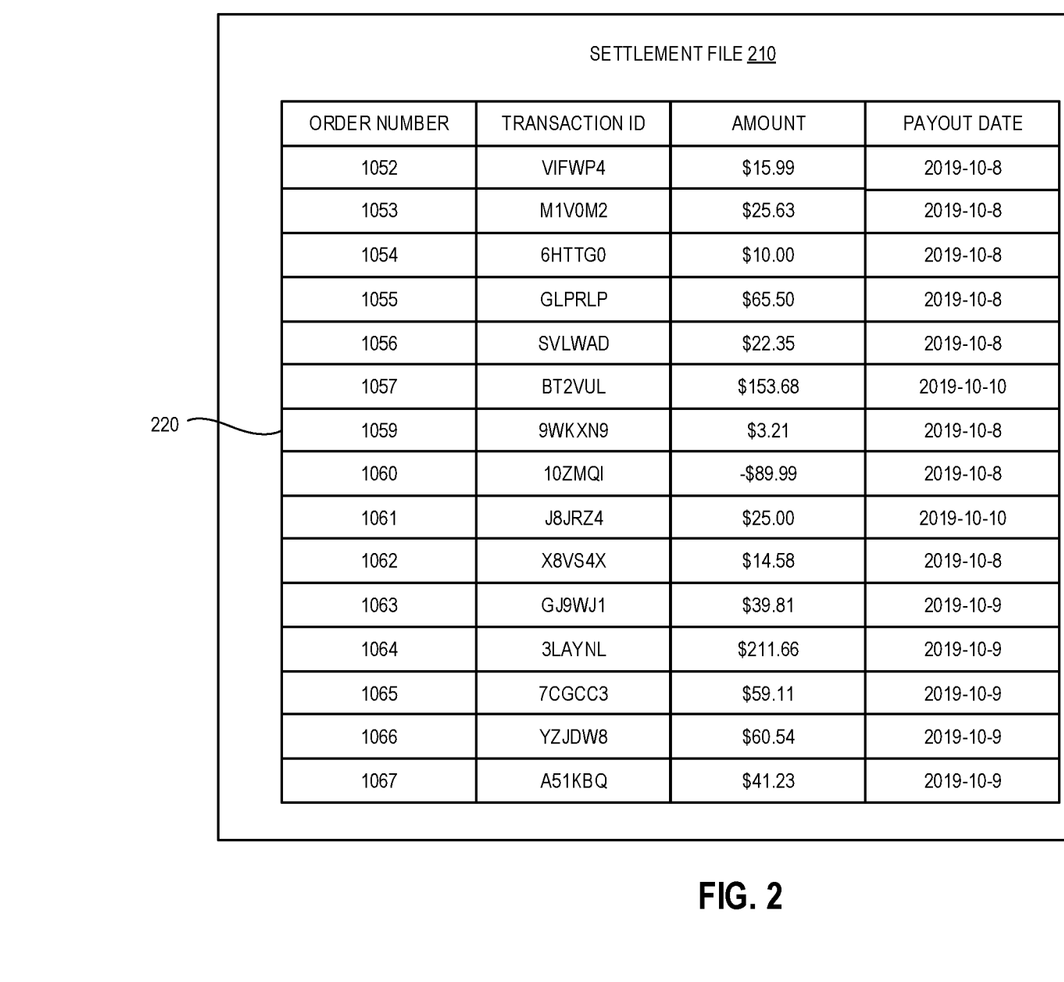
FIG. 2 is an example settlement file according to one embodiment generated by a commerce platform that reconciles financial transactions between a merchant and one or more consumers.

FIG. 2 is an example settlement file 210 according to one embodiment that has been generated by a commerce platform 110 that reconciles financial transactions between a merchant and one or more consumers. The settlement file 210 may include any suitable number of columns and rows. The settlement file 210 may be configured in any other suitable format and is not limited to a table with columns and rows. The settlement file 210 may include the transaction IDs for all the transactions that have occurred during the time period that is covered by the settlement file 210. The settlement file 210 may additionally include the order numbers that are associated with each of the transaction IDs for all the transactions that have occurred during the time period that is covered by the settlement file 210. The settlement file 210 may include other types of transactions in addition to purchase transactions, including discounts, refunds, charge backs, etc., such as the refund associated with the transaction associated with order number 1060. The difference between a refund and a charge back may be that a chargeback may be initiated by the consumer and may (but doesn't have to) result in a return of funds. A refund may be a payment operation initiated by the merchant, and may refer to a specific financial transaction and allows the merchant to return the entire or part of the transaction amount. The settlement file 210 may also include a payout date associated with when a payout or other remuneration was provided from the commerce platform or other system (e.g., bank system) to the merchant system receiving the settlement file 210.

The order numbers may be tied to the transaction IDs. That is, if the settlement file 210 is formatted as a table where each row contains a transaction ID and order number, if the rows are rearranged, each transaction ID and associated order number move together. The rows may be arranged such that the order numbers appear in sequential order. In particular embodiments, order numbers received later in time are greater than order numbers received earlier in time. If the first row in the settlement file 210 is n, the second row may be n+1, the third row may be n+2, and so on. Row n may correspond to a transaction that occurred at time t, row n+1 may correspond to a transaction that occurred at time t+1, and so on. An example of this is illustrated in FIG. 2 by settlement file 210, where the first row has an order number of 1052, the second row has an order number of 1053, and so on.

In particular embodiments, if any order number is missing, there may be a gap in the order numbers, such as cell 220 which has order number 1059 appearing right below 1057. If this is the case, the commerce platform 110 may detect such an anomaly and may send a message to the merchant system 120. The message may alert the merchant system 120 that an order number is missing (in this example, order number 1058 is missing), and may request the merchant system 120 to re-send the missing order number and the associated transaction ID, if it exists. The merchant system 120 may then respond by acknowledging the message and either sending the missing information, or sending an indication that the information does not exist. If the missing information is sent, the commerce platform 110 may insert the newly received order number and transaction ID into the appropriate location in the settlement file 210. If the missing information is not sent, the commerce platform 110 may proceed with completing the settlement file 210 as is. Note that there may be more information associated with the settlement file 210, such as a price of each order associated with each transaction ID and order number, as is illustrated by FIG. 2. In some embodiments, the settlement file 210 may include one or more payout amounts that indicates how much the commerce platform 110 has paid the merchant, and a date (e.g., the payout date) on which payment occurred.

The payout amounts may be based on the price total of each transaction or a batch or transactions associated with an order number, and may represent the amount that the merchant is paid by the commerce platform 110, after the commerce platform 110 has subtracted fees and costs. For example, the commerce platform 110 may charge the merchant 2.9% on all transactions. The settlement file 210 may further include the payout date for the settlement file. This date may be the same date the settlement file 210 is sent to the merchant system 120, correspond to a date range of the settlement file, may cover a date range specified by a merchant, etc.

Other information that may be included in the settlement file 210 may include SKU numbers, a time sold, a source of the transaction (e.g., online marketing campaign, email subscription, organic traffic), a payment method, or any other suitable information. In embodiments, the settlement file 210 may present the ordered and organized transaction information regardless of the different types of transactions, payment methods, sources, etc., therefor simplifying the source of settlement information, and thus the settlement process performed by merchant systems/commerce platforms. Also note that the transaction IDs illustrated in FIG. 2 are examples only and are not limited to a six-digit alphanumeric string. The transaction IDs may be any suitable identifier, for example a string containing any type and number of characters. The same applies for the order number, so long as it is possible to sort the order numbers in sequential order.

Figure 3:
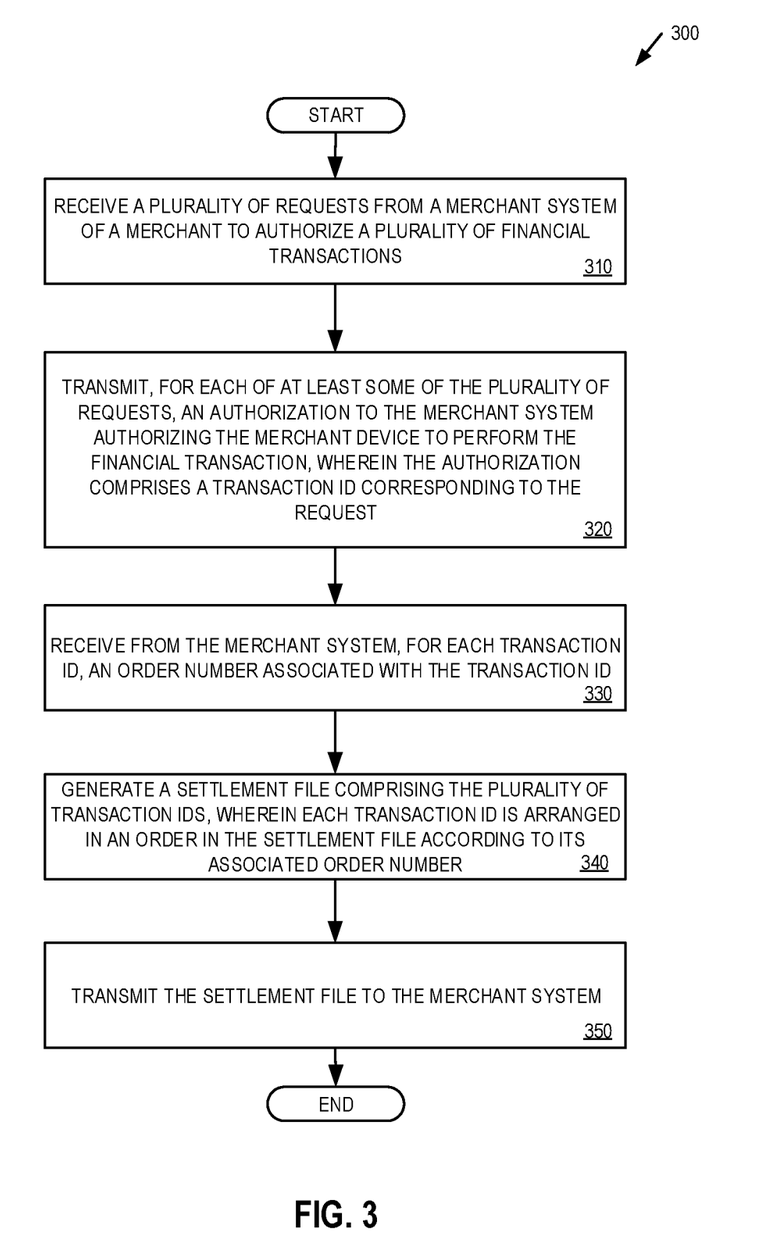
FIG. 3 is a flow diagram of one embodiment of a method of performing a commerce platform for reconciling transactions between a merchant and one or more consumers.

FIG. 3 is a flow diagram of one embodiment of a method 300 of performing a commerce platform 110 for reconciling transactions between a merchant and one or more consumers. The method 300 is performed by processing logic that may comprise hardware (circuitry, dedicated logic, etc.), software (such as is run on a general-purpose computer system or a dedicated machine), firmware, or a combination thereof. In one embodiment, the method 300 is performed by one or more commerce platform server computer systems and optionally one or more merchant system server computer systems (e.g., commerce platform 110 and merchant system 120).

Referring to FIG. 3, processing logic of the commerce platform server(s) begins by receiving a plurality of requests from a merchant system 120 of a merchant to authorize a plurality of financial transactions (processing block 310). The plurality of requests may be received one at a time or many requests may be received simultaneously. In either case, multiple requests are received by the commerce platform 110. Each request may be an authorization request wherein the merchant system 120 requests the commerce platform 110 to authorize a financial transaction between the merchant and a consumer. For example, if a consumer wishes to purchase a pair of shoes from the merchant using the commerce platform 110's online payment functionality, the merchant system 120 may send the authorization request. Authorizing the request may involve authenticating the merchant and the consumer, determining that sufficient funds exist in the consumer's account, or any other suitable action.

Processing logic sends, for each of at least some of the plurality of requests, an authorization to the merchant system 120 authorizing the merchant device to perform the financial transaction, wherein the authorization comprises a transaction ID corresponding to the request (processing block 320). This may involve generating a transaction ID for each authorization request that the commerce platform 110 approves. In an alternative embodiment, the merchant system may generate a transaction ID for each sought authorization, and the commerce platform references this transaction ID within an authorization result. The commerce platform 110 may not approve every request. For the requests that are approved, the commerce platform 110 may generate or reference, for each authorized request, a transaction ID that uniquely identifies the transaction that has been authorized, and may send the transaction ID along with the authorization to the merchant system 120.

Processing logic receives, from the merchant system 120, for each transaction ID (e.g., authorized transaction), an order number associated with the transaction ID (processing block 330). Associated with this processing block, the merchant system 120 may generate an order number when it receives the transaction ID for an authorized transaction from the commerce platform 110. The transaction ID and the order number may always be associated with one another, for example forming an index or reference between the order number and the transaction ID. The order number may serve to indicate when the transaction ID, authorization, or combination, was generated relative to the other transaction IDs during a given period of time. In embodiments, the order number may be any sequential data, such as an alphanumeric sequence.

Processing logic generates a settlement file (processing block 340). The settlement file may include the plurality of transaction IDs, wherein each transaction ID is arranged in an order in the settlement file according to its associated order number. This may be in sequential order as illustrated in FIG. 2 or may be in any other suitable order that is useful to the merchant and the commerce platform 110 in reconciling the transactions that have occurred during the given period of time (e.g., sequential increasing or decreasing for all authorized transaction within a given period for which payout has occurred, sequential increasing or decreasing for a given payment method for transactions within a given time period, etc.). Processing logic then transmits the settlement file to the merchant system 120 (processing block 350).

Figure 4:
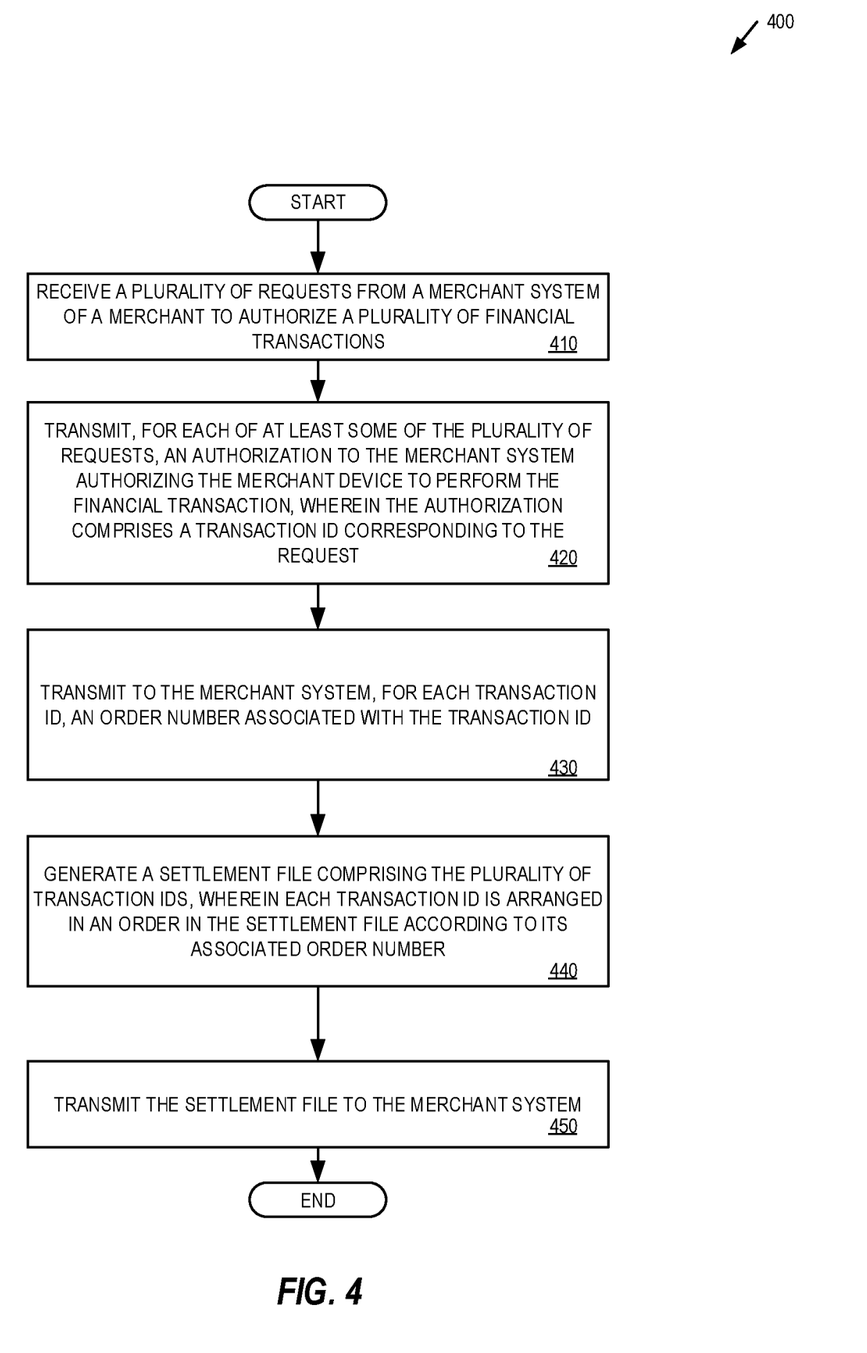
FIG. 4 is a flow diagram of one embodiment of a method for reconciling financial transactions between a merchant and one or more consumers.

FIG. 4 is a flow diagram of one embodiment of a method for reconciling financial transactions between a merchant and one or more consumers. The method 400 is performed by processing logic that may comprise hardware (circuitry, dedicated logic, etc.), software (such as is run on a general-purpose computer system or a dedicated machine), firmware, or a combination thereof. In one embodiment, the method 400 is performed by one or more commerce platform server computer systems (e.g., commerce platform server(s) 110).

Referring to FIG. 4, processing logic of the commerce platform server(s) may perform substantially similar operations to the processing blocks illustrated and discussed with reference to FIG. 3, with the exception of the location in which the order number is generated. The processing logic generates the order number in conjunction with generating the transaction ID, and then may send to the merchant system 120, for each transaction ID, the order number associated with the transaction ID (processing blocks 420 and 430). Thus, instead of the merchant system 120 receiving the transaction ID, generating the order number, and sending the order number back to the commerce platform 110, in this embodiment, the merchant system 120 receives the transaction ID and the order number together. The commerce platform 110 may then generate the settlement file using the transaction IDs and the order numbers it previously generated (processing block 440). This may be beneficial because it involves fewer messages being sent back and forth between the merchant system 120 and the commerce platform 110. Processing blocks 410, 440 and 450 may be substantially similar to processing blocks 310, 340, and 350, respectively.

Figure 5:
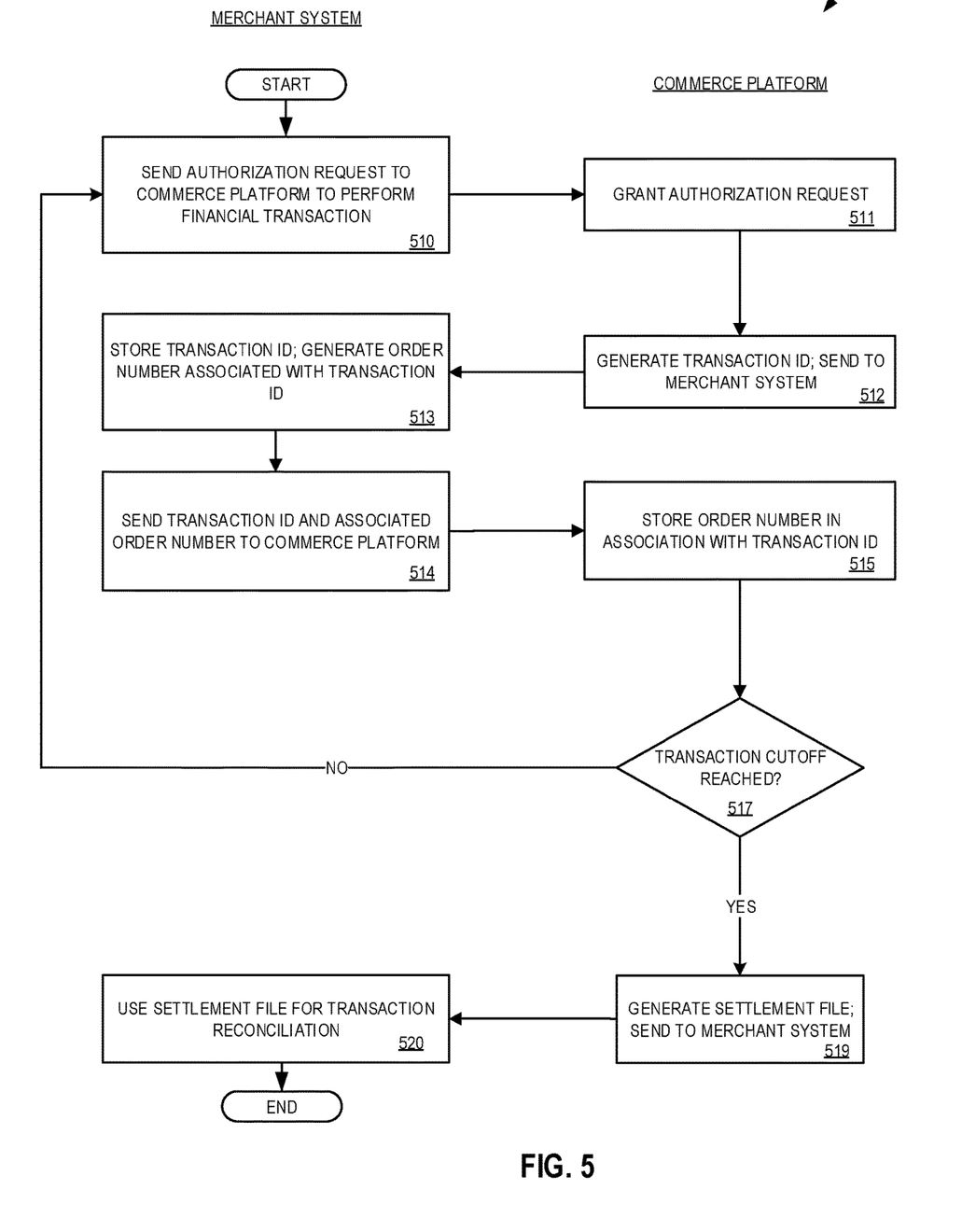
FIG. 5 is an interaction diagram according to one embodiment of a method of interaction between a merchant system and a commerce platform for reconciling financial transactions between a merchant and one or more consumers.

FIG. 5 is an interaction diagram according to one embodiment of a method of interaction between a merchant system and a commerce platform for reconciling financial transactions between a merchant and one or more consumers. The method 500 is performed by processing logic that may comprise hardware (circuitry, dedicated logic, etc.), software (such as is run on a general-purpose computer system or a dedicated machine), firmware, or a combination thereof. The processing logic may be on the commerce platform 110 or on a merchant system 120. Merchant system 120 may be running on a merchant application, or on a merchant-consumer interface on a consumer system 130 such as a web page, smartphone application, or other suitable application.

Referring to FIG. 5, processing logic of the merchant system 120 begins by sending an authorization request to the commerce platform 110 to perform a financial transaction, as discussed herein (processing block 510). Processing logic of the commerce platform 110 may approve this authorization request (processing block 511). Processing logic of the commerce platform 110 may generate a transaction ID for the transaction as discussed herein and may send the transaction ID to the merchant system 120 (processing block 512). Processing logic of the merchant system 120 may store the transaction ID in an appropriate storage location, and may generate an order number associated with the transaction ID (processing block 513). Processing logic of the merchant system 120 may send the transaction ID and associated order number to the commerce platform 110 (processing block 514). Processing logic of the commerce platform 110 may store the order number in association with the transaction ID in an appropriate location (e.g., transaction data store 119) (processing block 515). The above processing blocks 510-515 may be repeated for every authorization request that is sent by the merchant system 120 and received by the commerce platform 110.

In particular embodiments, the commerce platform 110 may receive a first authorization request, then may transmit a first transaction ID to the merchant system 120. Before receiving the corresponding order number for the first transaction ID, the commerce platform 110 may then receive a second authorization request and may generate a second transaction ID and may transmit the second transaction ID to the merchant system 120. At that point, the merchant system may send the order numbers associated with the sent transaction IDs. Thus, the commerce platform 110 may then receive a first order number associated with the first transaction ID, and may then receive a second order number associated with the second transaction ID, wherein the second order number is greater than the first order number.

Processing logic of the commerce platform 110 may determine whether a transaction cutoff time has been reached (processing block 517). The transaction cutoff time may indicate the end of the given period of time for which the settlement file will account for the transactions that occurred further the given period of time. For example, the given period of time may be Saturday, September 14. The beginning of the period of time may be at 12:00 AM Saturday, September 14, and the end may be at 11:59 PM on the same day. Thus, the cutoff time may be at 11:59 PM. Any other suitable cutoff time may be used. If the cutoff period has not been reached, the method 500 may repeat the operations of processing blocks 510-515 for each authorization request that is received at the commerce platform 110. If the transaction cutoff time has been reached, processing logic of the commerce platform 110 generates the settlement file according to the processes discussed herein (processing block 519). The settlement file may include the transaction IDs in an order as specified by the order numbers associated with the transaction IDs.

In some embodiments, the settlement file 210 generated by the commerce platform 110 may differ from the records generated by the commerce system 120 because the clock relied upon by the commerce platform 110 may differ from the clock relied on by the merchant system 120. As an example and not by way of limitation, the commerce platform 110 may rely on a clock that runs in a different time period ahead of the clock relied upon by the merchant system 120. Thus, the cutoff time for the commerce platform 110 may occur before the cutoff time for the merchant system 120. During that mismatched time period, one or more financial transactions may occur. These transactions may not be reflected in the settlement file that the merchant system 120 expects them to appear in. Instead, they may appear in the next settlement file that the commerce platform 110 generates for the merchant. This may be undesirable because it may be difficult to reconcile financial transactions when this occurs. To remedy this situation, the commerce platform 110 may synchronize a transaction clock used for time stamping a financial transaction with a clock of the merchant system 120, wherein the transaction clock indicates a time that each of the plurality of financial transaction occurs. In another embodiment, commerce platform may adjust a time stamp in transaction records based on a clock or other information known about the merchant system 120. In yet another embodiment, a merchant system may specify a custom time period, which commerce platform accounts for timing differences between the merchant and commerce platform. For example, based on geographic differences between the merchant and commerce platform, an authorization occurring in a first time zone and communicated to a merchant in a second time zone could appear to occur at different time, dates, etc. Therefore, in embodiments, commerce platform may adjust (e.g., synchronize) its clock or time stamp records when storing a transaction, authorization, order numbers, in a data store, and/or when generating settlement file, to be consistent with the merchant system. This prevents confusion or ambiguities in settlement files, and further improves the efficiency and reliability with which the merchant system can perform settlement. That is, the transactions will appear in the settlement file that the merchant expects them to appear in (e.g. for a requested time period, date range, etc.). This may serve to streamline the reconciliation process that the processing logic of the merchant system 120 undertakes, since fewer table rows in the merchant's database will have discrepancies with the commerce platform's settlement file. This reduces the computing power required by the commerce platform or the merchant system and also reduces latencies that commonly occur in traditional reconciliation systems.

In particular embodiments, the commerce platform 110, on the date specified in the settlement file 210, may send one or more payment amounts to the merchant. The one or more payment amounts may equal a sum that the commerce platform 110 has agreed to pay the merchant for the sales made in a given period of time. The one or more payment amounts may be arranged in an order that substantially matches the order of the transaction IDs in the settlement file that corresponds to the given period of time. For example, the settlement file 210 may specify that 100 transactions occurred on Saturday September 14. The payment amount for each transaction may also be included in the settlement file. The payout that commerce platform 110 sends to the merchant may be separated into payment amounts that substantially match the order of the transaction IDs in the settlement file.

Figure 6:
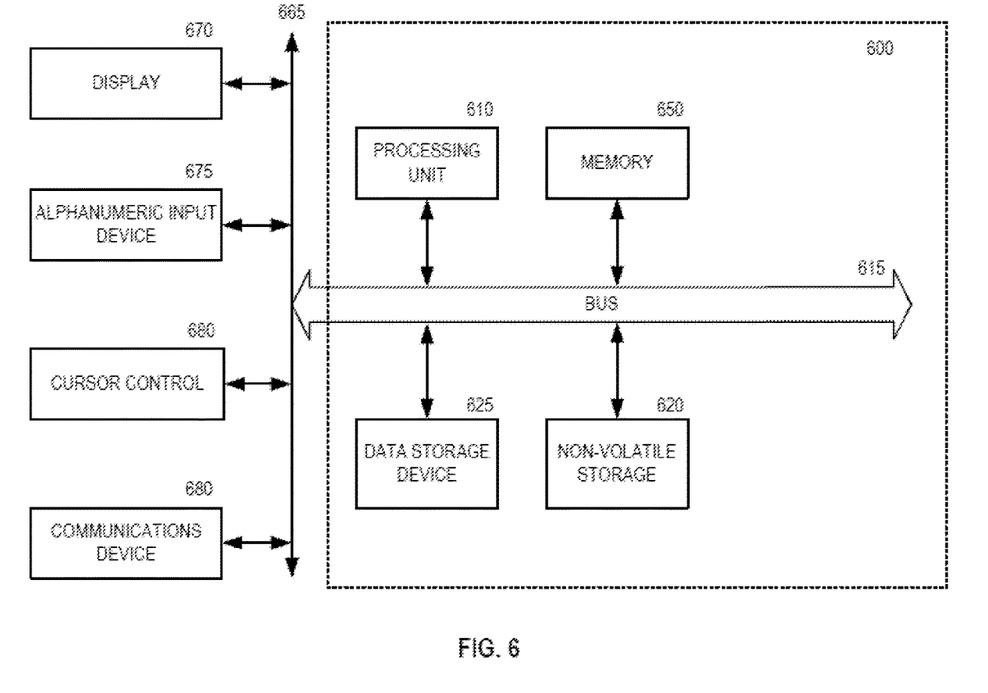
FIG. 6 is one embodiment of a computer system that may be used to support the systems and operations discussed herein.

FIG. 6 is one embodiment of a computer system that may be used to support the systems and operations discussed herein. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

Figure 7:
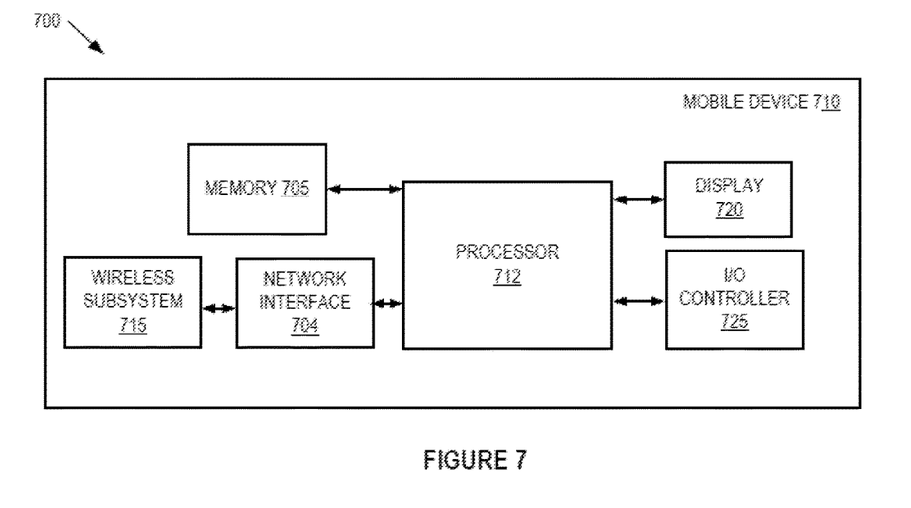
FIG. 7 is one embodiment of a mobile device that may be used to support the systems and operations discussed herein.

FIG. 7 is block diagram of one embodiment 700 of a mobile device. Mobile device 710 provides additional details for mobile devices discussed above in FIGS. 1 and 2.

In one embodiment, mobile device 710 is a system, which may include one or more processors 712, a memory 705, I/O controller 725, network interface 704, and display 720. Mobile device 710 may also include a number of processing modules, which may be implemented as hardware, software, firmware, or a combination. It should be appreciated that mobile device 710 may also include, although not illustrated, a user interface (e.g., keyboard, touch-screen, or similar devices), a power device (e.g., a battery), as well as other components typically associated with electronic devices. Network interface 704 may also be coupled to a number of wireless subsystems 715 (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems). In one embodiment, both network interface 704 and wireless subsystem 715 couple mobile device 710 to a network.

Memory 705 may be coupled to processor 712 to store instructions for execution by processor 712. In some embodiments, memory 705 is non-transitory. It should be appreciated that embodiments as described herein may be implemented through the execution of instructions, for example as stored in the memory 705 or other element, by processor 712 of mobile device 710 and/or other circuitry of mobile device 710 and/or other devices. Particularly, circuitry of mobile device 710, including but not limited to processor 712, may operate under the control of a program, routine, or the execution of instructions to execute methods or processes in accordance with the embodiments described herein. For example, such a program may be implemented in firmware or software (e.g. stored in memory 705 and/or other locations) and may be implemented by processors, such as processor 712, and/or other circuitry of mobile device 710. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by mobile device 710 itself and/or some or all of the functions, engines or modules described herein may be performed by another system connected through I/O controller 725 or network interface 704 (wirelessly or wired) to mobile device 710. Thus, some and/or all of the functions may be performed by another system and the results or intermediate calculations may be transferred back to mobile device 710. In some embodiments, such other device may comprise a server, such as commerce platform 110.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method for electronic transaction reconciliation comprising:
    transmitting, from a first computing system to a second computing system using a communications network, a plurality of authorization requests to authorize a corresponding plurality of electronic transactions;
    receiving, by the first computing system for each of at least some of the plurality of electronic requests, an authorization message from the second computing system that authorizes a device associated with the first computing system to perform an electronic transaction, wherein each authorization message is transmitted using the communications network and comprises a unique transaction ID that corresponds to one of the at least some of the plurality of electronic requests;
    generating, by the first computing system for each unique transaction ID, an order number associated with the unique transaction ID, wherein the order number corresponding to the unique transaction ID is generated based on transmission time data of the corresponding unique transaction ID, such that a first order number for an earlier transmitted unique transaction ID is smaller than a second order number for a later transmitted unique transaction ID, and wherein the order number generated by an application programming interface (API) executed at the first computing system, the API distributed by the second computing system;
    transmitting, by the first computing system to the second computing system, one or more order numbers associated with corresponding one or more unique transaction IDs;
    transmitting, by the first computing system to the second computing system, a request for a settlement file that causes the second computing system to generate the settlement file comprising a plurality of unique transaction IDs, wherein each unique transaction ID is arranged according to the associated order number, such that the plurality of unique transaction IDs are ordered chronologically by time; and receiving, by the first computing system transmitted from the second computing system in response to an ending of a predetermined time period, a settlement file message comprising the settlement file and a plurality of transaction data arranged in an order that substantially matches the order of the plurality of unique transaction IDs in the settlement file, and the settlement file further comprises: a plurality of payment amounts that the first computing system is to pay to the second computing system for each of the unique transaction IDs that correspond to the plurality of electronic requests, and a payout date for the settlement file that specifies a date by which the first computing system will pay the second computing system the payment amounts in the settlement file.

2. The method of claim 1, further comprising:
performing, by the first computing system with the second computing system, a synchronization process of a clock of the first computing system with a transaction clock of the second computing system, the transaction clock used for transaction identification (ID) generation by the second computing system, and the transaction clock indicates a time when electronic transactions occur.

3. The method of claim 1, wherein transmitting, by the first computing system to the second computing system, the one or more order numbers associated with corresponding one or more unique transaction IDs further comprises sending order number and unique transaction ID pairs to the second computing system.

4. The method of claim 1, wherein the corresponding plurality of electronic transactions comprises purchases, discounts, refunds, charge backs, or a combination thereof performed by the second computing system on behalf of the first computing system.

5. A non-transitory computer readable storage medium including instructions that, when executed by a processor, cause the processor to perform a method for electronic transaction reconciliation, the method comprising:

transmitting, from a first computing system to a second computing system using a communications network, a plurality of authorization requests to authorize a corresponding plurality of electronic transactions;

receiving, by the first computing system for each of at least some of the plurality of electronic requests, an authorization message from the second computing system that authorizes a device associated with the first computing system to perform an electronic transaction, wherein each authorization message is transmitted using the communications network and comprises a unique transaction ID that corresponds to one of the at least some of the plurality of electronic requests;

generating, by the first computing system for each unique transaction ID, an order number associated with the unique transaction ID, wherein the order number corresponding to the unique transaction ID is generated based on transmission time data of the corresponding unique transaction ID, such that a first order number for an earlier transmitted unique transaction ID is smaller than a second order number for a later transmitted unique transaction ID, and wherein the order number generated by an application programming interface (API) executed at the first computing system, the API distributed by the second computing system;

transmitting, by the first computing system to the second computing system, one or more order numbers associated with corresponding one or more unique transaction IDs;

transmitting, by the first computing system to the second computing system, a request for a settlement file that causes the second computing system to generate the settlement file comprising a plurality of unique transaction IDs, wherein each unique transaction ID is arranged according to the associated order number, such that the plurality of unique transaction IDs are ordered chronologically by time; and receiving, by the first computing system transmitted from the second computing system in response to an ending of a predetermined time period, a settlement file message comprising the settlement file and a plurality of transaction data arranged in an order that substantially matches the order of the plurality of unique transaction IDs in the settlement file, and the settlement file further comprises: a plurality of payment amounts that the first computing system is to pay to the second computing system for each of the unique transaction IDs that correspond to the plurality of electronic requests, and a payout date for the settlement file that specifies a date by which the first computing system will pay the second computing system the payment amounts in the settlement file.

6. The non-transitory computer readable storage medium of claim 5, further comprising:
performing, by the first computing system with the second computing system, a synchronization process of a clock of the first computing system with a transaction clock of the second computing system, the transaction clock used for transaction identification (ID) generation by the second computing system, and the transaction clock indicates a time when electronic transactions occur.

7. The non-transitory computer readable storage medium of claim 5, wherein transmitting, by the first computing system to the second computing system, the one or more order numbers associated with corresponding one or more unique transaction IDs further comprises sending order number and unique transaction ID pairs to the second computing system.

8. The non-transitory computer readable storage medium of claim 5, wherein the corresponding plurality of electronic transactions comprises purchases, discounts, refunds, charge backs, or a combination thereof performed by the second computing system on behalf of the first computing system.

9. A system that reconciles electronic transactions, the system comprising:
a memory that stores user commerce account information; and
a processor coupled with the memory configured to:
transmit, from a first computing system to a second computing system using a communications network, a plurality of authorization requests to authorize a corresponding plurality of electronic transactions;
receive, by the first computing system for each of at least some of the plurality of electronic requests, an authorization message from the second computing system that authorizes a device associated with the first computing system to perform an electronic transaction, wherein each authorization message is transmitted using the communications network and comprises a unique transaction ID that corresponds to one of the at least some of the plurality of electronic requests;

generate, by the first computing system for each unique transaction ID, an order number associated with the unique transaction ID, wherein the order number corresponding to the unique transaction ID is generated based on transmission time data of the corresponding unique transaction ID, such that a first order number for an earlier transmitted unique transaction ID is smaller than a second order number for a later transmitted unique transaction ID, and wherein the order number generated by an application programming interface (API) executed at the first computing system, the API distributed by the second computing system;

transmit, by the first computing system to the second computing system, one or more order numbers associated with corresponding one or more unique transaction IDs;

transmit, by the first computing system to the second computing system, a request for a settlement file that causes the second computing system to generate the settlement file comprising a plurality of unique transaction IDs, wherein each unique transaction ID is arranged according to the associated order number, such that the plurality of unique transaction IDs are ordered chronologically by time; and receive, by the first computing system transmitted from the second computing system in response to an ending of a predetermined time period, a settlement file message comprising the settlement file and a plurality of transaction data arranged in an order that substantially matches the order of the plurality of unique transaction IDs in the settlement file, and the settlement file further comprises: a plurality of payment amounts that the first computing system is to pay to the second computing system for each of the unique transaction IDs that correspond to the plurality of electronic requests, and a payout date for the settlement file that specifies a date by which the first computing system will pay the second computing system the payment amounts in the settlement file.

10. The system of claim 9, further comprising the processor configured to:

performing, by the first computing system with the second computing system, a synchronization process of a clock of the first computing system with a transaction clock of the second computing system, the transaction clock used for transaction identification (ID) generation by the second computing system, and the transaction clock indicates a time when electronic transactions occur.

11. The system of claim 9, wherein transmitting, by the first computing system to the second computing system, the one or more order numbers associated with corresponding one or more unique transaction IDs further comprises sending order number and unique transaction ID pairs to the second computing system.

* * * * *